J. A. HASSELL.
FOLDING FLYTRAP.
APPLICATION FILED MAR. 19, 1920.

1,359,060.

Patented Nov. 16, 1920.
2 SHEETS—SHEET 1.

Witness

Inventor
J. A. Hassell,
By C. A. Snow & Co.
Attorneys

J. A. HASSELL.
FOLDING FLYTRAP.
APPLICATION FILED MAR. 19, 1920.
1,359,060.
Patented Nov. 16, 1920.
2 SHEETS—SHEET 2.
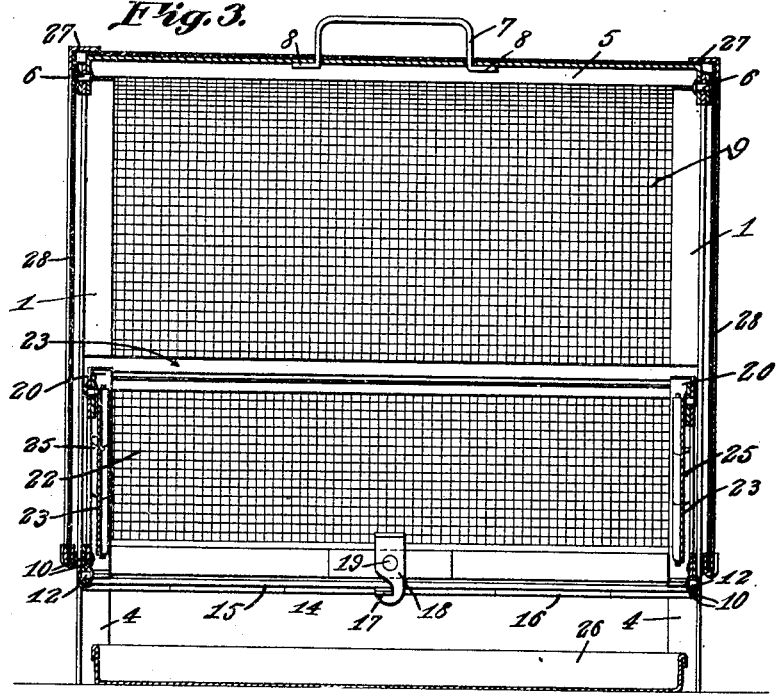
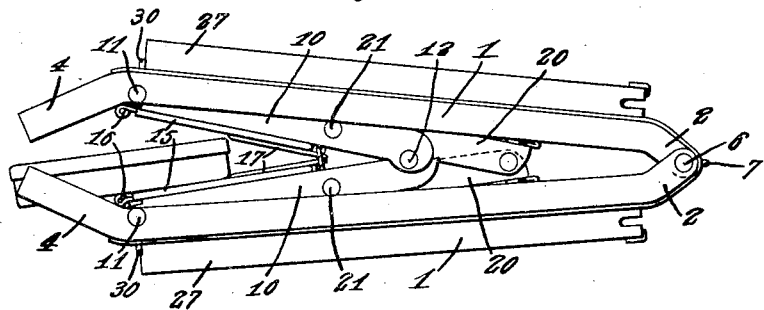
Witness
Inventor
J. A. Hassell,
By
Attorneys

UNITED STATES PATENT OFFICE.

JOHN A. HASSELL, OF BISBEE, ARIZONA.

FOLDING FLYTRAP.

1,359,060.  Specification of Letters Patent.  Patented Nov. 16, 1920.

Application filed March 19, 1920. Serial No. 367,104.

*To all whom it may concern:*

Be it known that I, JOHN A. HASSELL, a citizen of the United States, residing at Bisbee, in the county of Cochise and State of Arizona, have invented a new and useful Folding Flytrap, of which the following is a specification.

The device forming the subject matter of this application is an insect trap adapted primarily for catching flies, and the invention aims to provide a trap of the kind mentioned which can be folded up into small compass when not in use.

Within the scope of what is claimed, a mechanic may make changes, without departing from the spirit of the invention.

In the drawings:—

Fig. 3 is a longitudinal section of the trap, and

Fig. 4 is an end elevation wherein the trap is shown folded.

Figure 1:
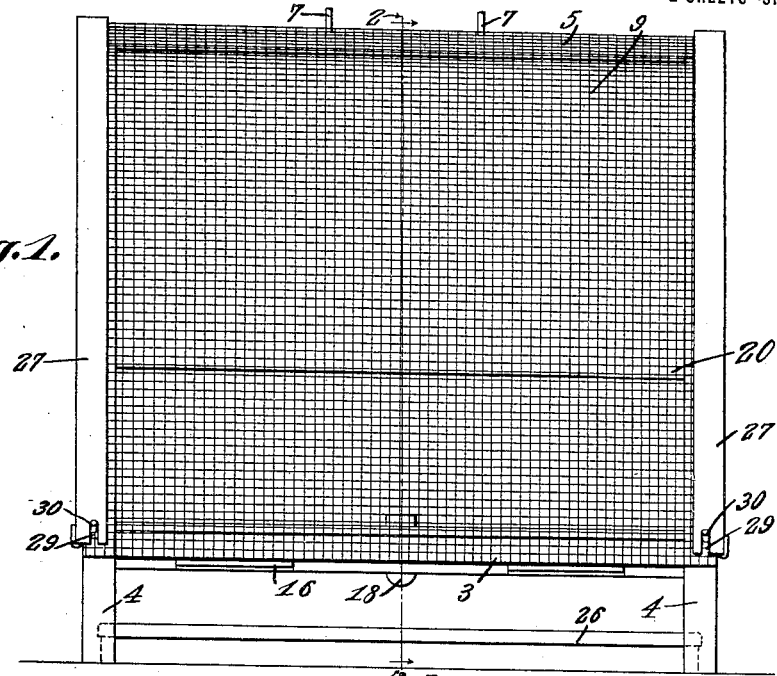
Figure 1 shows in side elevation, a trap constructed in accordance with the invention.

The trap forming the subject matter of this application includes diverging outer sides, comprising end bars 1, the upper extremities of which are bent toward each other as shown at 2 to facilitate the folding up of the trap. The end bars 1 are connected by bottom bars 3 which are extended beyond the bottom bars to form legs 4. A ridge strip 5 is provided and is united with the upper ends 2 of the members 1 by means of pivot elements 6. A handle 7 is mounted to slide vertically in the ridge strip 5 and is supplied at its inner end with projections 8, which, engaging the ridge strip prevent the handle from being withdrawn completely, while the trap is being carried about by means of the handle. A strip of netting 9 or other flexible material is secured at its ends to the bottom bars 3 and extended across the ridge strip 5.

The outer ends of braces 10 are united by pivot elements 11 with the lower ends of the bars 1, the inner ends of the braces 10 being united by pivot elements 12. The pivot elements 11 at the respective ends of the strap are connected by cross pieces 14. The braces 10 like other parts hereinbefore alluded to and hereinafter described are preferably in the form of angle members. One brace 10 of each pair has a projection 32, which, coöperating with the horizontal flange of the corresponding brace, as shown at 31 in Fig. 2, prevents the braces 10 from folding downwardly below the horizontal. Platforms 15 are hinged at 16 to the bottom bars 3 and are provided with keepers 17 adapted to be engaged by latches 18 pivoted at 19 on the cross pieces 14, intermediate the ends of the cross pieces.

The lower ends of rectangular frames 20 are pivoted as shown at 21 to the braces 10 and carry netting closures 22. The upper edges of the frames 10 are spaced apart to form an opening 23. Closures 24 are hinged at 25 to the end portions of the frame 20, the closures extending from one frame to the other.

Detachable end walls are provided, the same comprising triangular frames 27 closed in by netting 28, the lower end portions of the frames 27 having notches 29 adapted to receive pins 30 on the members 1.

Figure 2:
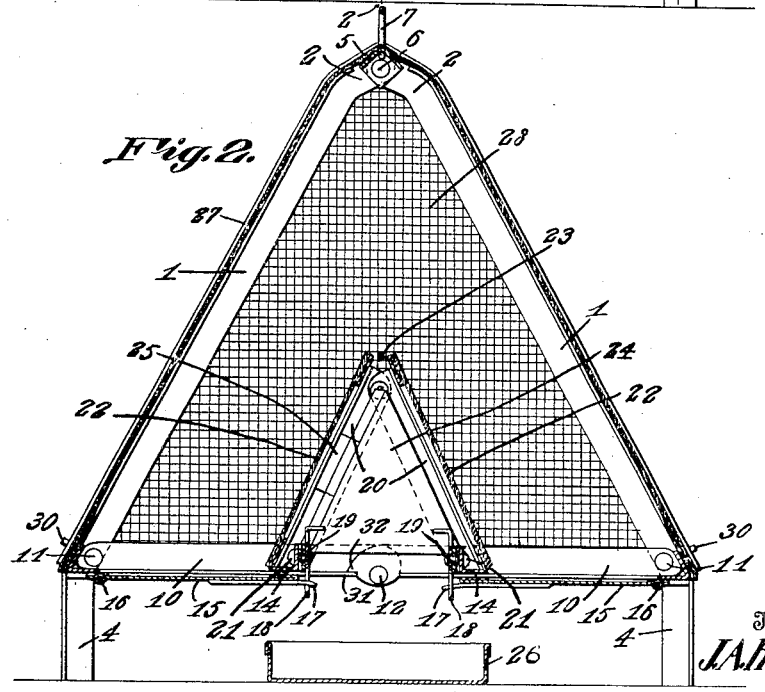
Fig. 2 is a section on the line 2—2 of Fig. 1.

A bait pan 26 is placed below the trap, as shown best in Fig. 2.

In practical operation, when the trap is set up, the end bars 1, the bottom bars 3, the netting 9 which extends across the ridge strip 5, the removable end members 27—28 and the platforms 15 define an outer compartment, the platforms 15 being held in horizontal position by keepers 17 and the latches 18. The frames 20 and their netting closures 22 form an inner compartment, together with the closures or doors 24, this inner compartment being open across its bottom, and having, at its top, the reduced opening 23 which is clearly shown in Fig. 2.

Insects, attracted by the bait in the pan 26, pass upwardly into the inner compartment, above defined, and move by way of the opening 23 into the outer compartment, from which they will not escape, owing to the well-known habits of flies and like insects.

When it is desired to collapse the trap, the outer end walls 27—28 are detached from the pins 30. The doors or closures 24 are swung forwardly on their hinges 25. The braces 10 are pushed upwardly, thus bringing the trap into the collapsed form shown in Fig. 4, it being possible to place the detachable parts 27—28 in the outer sides of the folded trap, as shown in Fig. 4, so that the entire structure occupies a small compass.

When it is desired to clean out the trap, the platforms 15 may be swung downwardly on the hinges 16, the latches 18 being detached from the keepers 17.

Having thus described the invention, what is claimed is:—

1. A foldable insect trap comprising diverging outer sides forming a main compartment, the upper portions of the sides being pivotally connected to form a main compartment; braces having their outer ends pivoted to the sides and having their inner ends pivotally united; diverging inner sides defining an inner compartment within the main compartment, the inner compartment having an opening at its top; closures hinged to the ends of the inner sides; and movable platforms extended between the lower ends of the outer sides and the lower ends of the inner sides.

2. A foldable insect trap comprising diverging outer sides forming a main compartment, the upper portions of the sides being pivotally connected to form a main compartment; braces having their outer ends pivoted to the sides and having their inner ends pivotally united; diverging inner sides defining an inner compartment within the main compartment, the inner compartment having an opening at its top; closures hinged to the ends of the inner sides; platforms hinged at their outer edges to the lower ends of the outer sides; cross pieces connecting the braces; and interengaging elements on the closures and the plaforms for upholding the platforms.

In testimony that I claim the foregoing as my own, I have hereto affixed my signature in the presence of two witnesses.

J. A. HASSELL.

Witnesses:
P. S. GARD,
JOHN GERDES.